United States Patent [19]

Lim et al.

[11] 4,253,989

[45] Mar. 3, 1981

[54] ZEOLITIC CATALYST AND METHOD OF PRODUCING SAME

[75] Inventors: John Lim, Anaheim; Ralph M. Haney, Woodland Hills, both of Calif.

[73] Assignee: Filtrol Corporation, Los Angeles, Calif.

[21] Appl. No.: 896,318

[22] Filed: Apr. 14, 1978

[51] Int. Cl.$^3$ ............................................. B01J 29/08
[52] U.S. Cl. ................................................ 252/455 Z
[58] Field of Search ................................... 252/455 Z

[56] References Cited

U.S. PATENT DOCUMENTS

| 3,234,147 | 2/1966 | Drost | 252/455 Z |
|---|---|---|---|
| 3,446,645 | 5/1969 | Drost | 252/455 Z |
| 3,451,948 | 6/1969 | Scott | 252/455 Z |
| 3,624,003 | 11/1971 | Conde et al. | 252/455 Z |
| 3,641,095 | 2/1972 | Kidvsky et al. | 252/455 Z |
| 3,972,835 | 8/1976 | Hoffman et al. | 252/455 Z |
| 4,010,116 | 3/1977 | Secor et al. | 252/455 Z |

*Primary Examiner*—Carl F. Dees
*Attorney, Agent, or Firm*—Philip Subkow; Bernard Kriegel

[57] ABSTRACT

The catalyst of this invention is composed of an exchanged zeolite of the faujasite type composited with a matrix composed of clay, alumina and silica added as sodium silicate, the added silica being in the range of about 0.5% to less than about 3.5% based on the composite catalyst on a volatile free basis.

10 Claims, 11 Drawing Figures

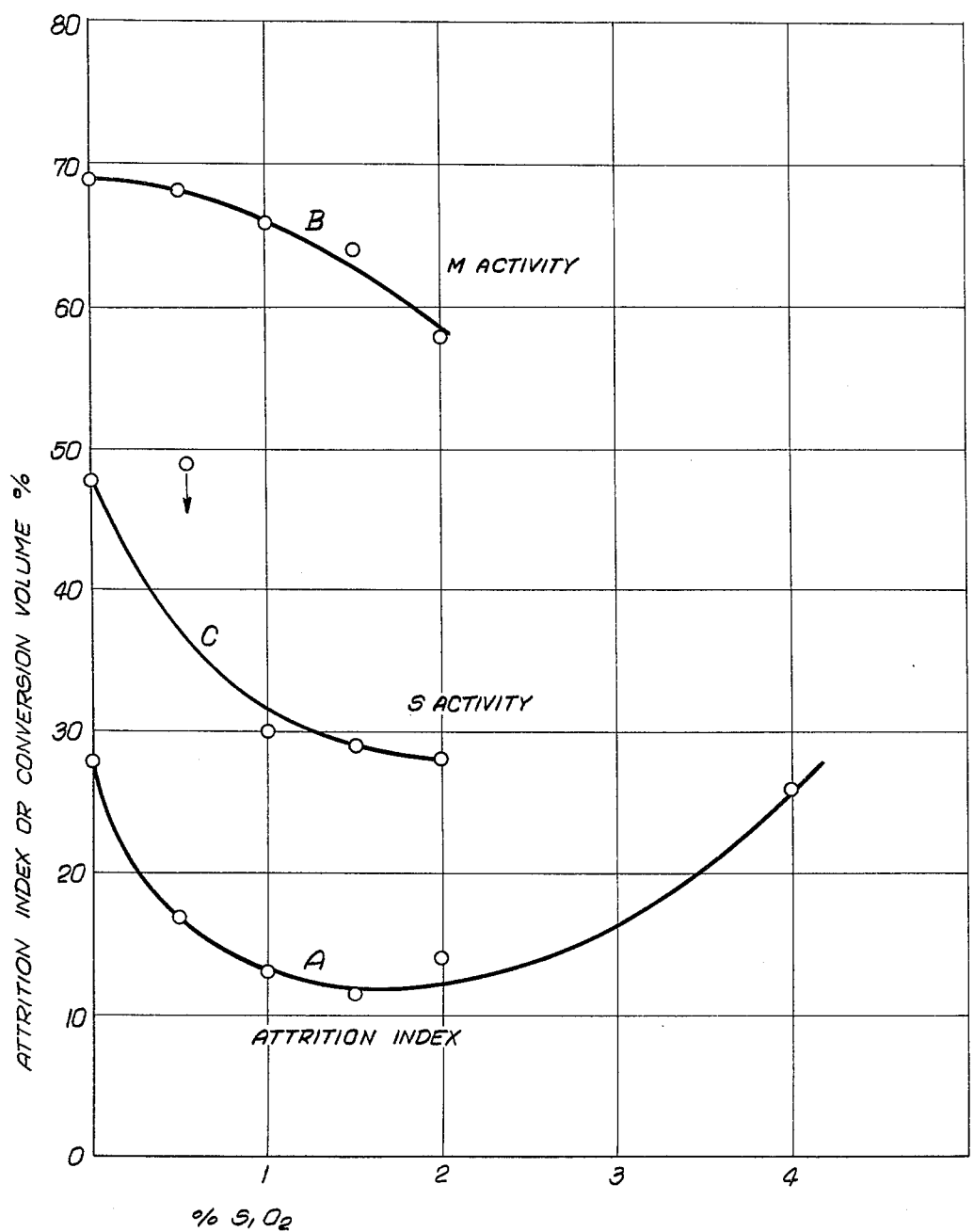
FIG. 1. (TABLE 1)

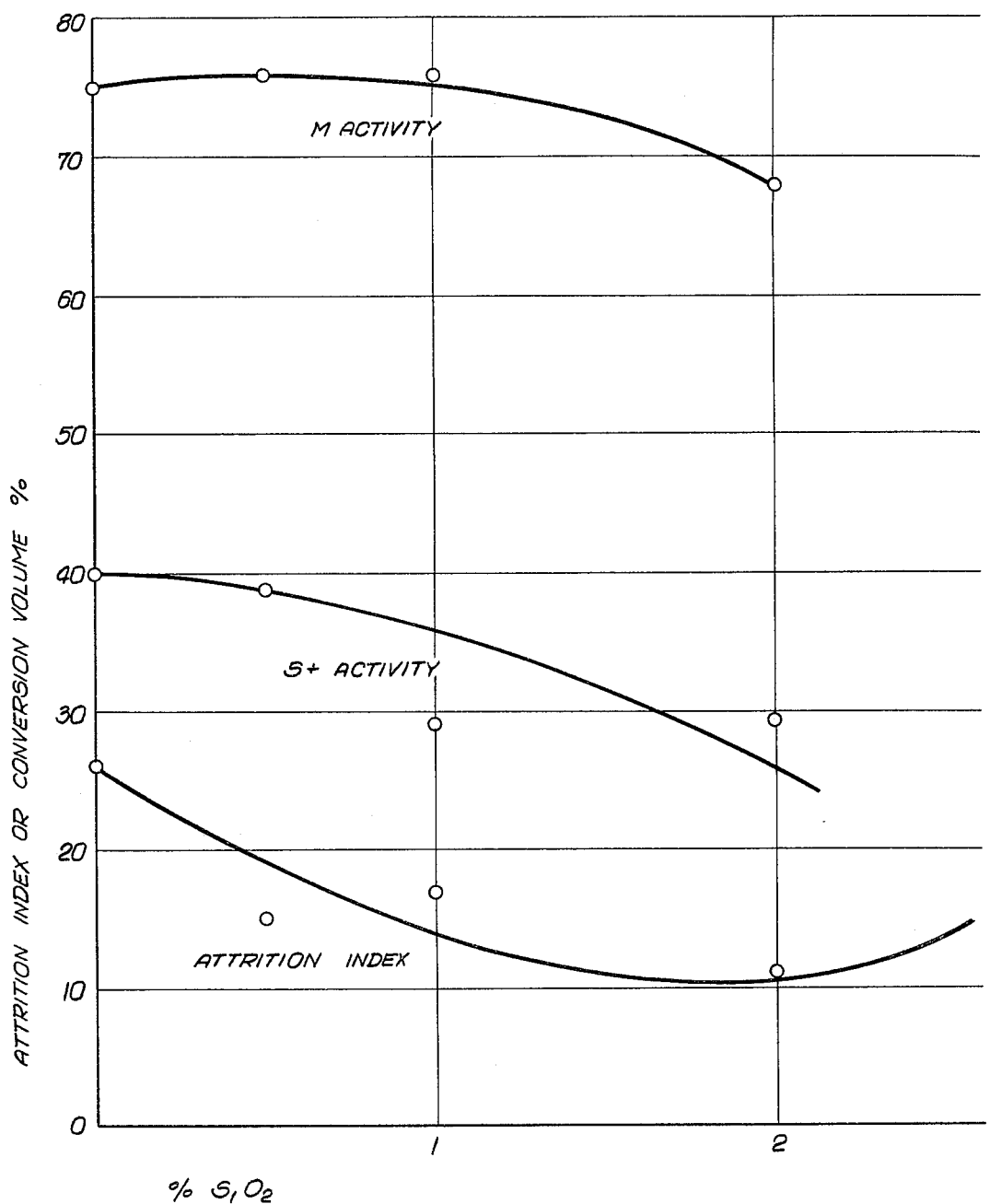
FIG. 2. (TABLE 2)

ZEOLITIC CATALYST AND METHOD OF PRODUCING SAME

This invention relates to catalysts formed from exchanged sodium zeolites particularly those of the faujasite type which are combined with a clay matrix. The catalysts are useful in hydrocarbon conversion such as cracking. Catalysts of this type are widely used in oil refining processes as is well known to those skilled in this art.

Catalysts of this type formed by spray drying slurries of the exchanged zeolite and clay has been in the prior art formulated employing alumina. In order to obtain catalysts of adequate abrasion resistance, it has been the practice to supplement the alumina containing clay and zeolite members by the addition of supplementary agents. See for example SMM as in U.S. Pat. No. 4,010,116 and ammonium poly silicate as in application Ser. No. 696,889.

The attrition resistance, expressed as Attrition Index (AI) is measured by a test described in said patent. The catalytic activity is determined by a test procedure referred to in the above patent. The M activity is determined by the cracking test after the catalyst is steamed at 1450° F. for 2 hours. The S+ activity is determined by steaming the catalyst at 1550° F. for two hours. The activity is stated as volume % conversion.

In the above procedures, a substantial concentration of the supplementary $SiO_2$ is added as silicate. The cation added thereby was not alkali metal and thus did not increase the sodium content of the catalyst above the equivalents introduced by the zeolite.

Drost U.S. Pat. No. 3,446,645, forms agglomerates of a molecular sieve desiccant (particularly zeolite A) and metakaolin, which is dusted to apply the clay to the surface of the agglomerate. It is then steeped in alkali metal silicate and fired.

Scott U.S. Pat. No. 3,451,948 states that it forms a spray dried slurry of a mixture of a crystaline sodium zeolite, kaolin and sodium silicate. The proportions of the sodium silicate added is stated to be equivalent to 12% of $SiO_2$ based on the spray dried catalyst.

STATEMENT OF THE INVENTION

We have discovered that we may obtain an active and attrition resistant catalysts in the form of microspheres by spray drying a faujasite type zeolite particularly a type-Y in an alumina and clay matrix by the addition of an alkali metal silicate preferably sodium silicate which is added to the slurry of the solids prior to spray drying. On a volatile free basis the composition ranges from about 15 to about 25% of the zeolite, about 15 to 25% of the pseudoboehmite expressed as $Al_2O_3$ and the remainder clay. The $SiO_2$ added as sodium silicate replaces the equivalent amount of clay.

We have also found that a great improvement in the attrition resistance is obtained as compared with the attrition resistance of the conventional three component catalyst (zeolite/clay-alumina) if the sodium silicate which is added to the slurry prior to spray drying, when expressed as $SiO_2$ on a volatile free basis is within very narrow limits.

We prefer, in order to obtain the improved attrition resistance, to limit the addition of the silicate so as to add $SiO_2$ in the range of about 0.5% to less than about 3.5% for example 3% based on the catalyst on a volatile free basis.

We have found that increasing said $SiO_2$ percentage to about 4% does not improve the attrition resistance over that of the catalyst without the added sodium silicate and increasing the added $SiO_2$ to 8% causes a disintegration of the microspheres in the test, i.e., they had no attrition resistance.

The added sodium, introduced by the sodium silicate acts to depreciate the activity of the catalyst. We have found, however, that by limiting the sodium content of the zeolite as well as limiting the amount of $SiO_2$ and, therefore, the sodium of the silicate, we may obtain a substantially improved attrition resistant catalyst with good activity.

It is desirable to limit the $SiO_2$ added as sodium silicate or the sodium content of the zeolite so that the sodium content of the finished catalyst contain less than 1% expressed as $Na_2O$ on a volatile free basis in order to obtain both a suitable attrition index of 20 or less and a desirable micro-activity value. Alternatively, the spray dried microspheres may be exchanged where the sodium content of the catalyst is excessively high to reduce the sodium content to less than about 1% expressed as $Na_2O$ on a volatile free basis.

The following examples taken together with FIGS. 1 and 2 illustrate our invention.

EXAMPLE 1

A zeolite having a $SiO_2/Al_2O_3$ ratio of 4.7 and an X-ray spectrum characteristic of a zeolite of the faujasite type such as described in the art as a Y zeolite was exchanged with ammonium sulfate solution at a pH of 4.5 at ambient temperature. The ammonium exchanged zeolite was mixed with rare earth sulfate solution at ambient temperatures. It was filtered and washed. The rare earth sulfate had the following analysis:

A typical analysis of the rare earth salts expressed as oxides is as follows:

| | |
|---|---|
| $La_2O_3$ | 57% |
| $CeO_2$ | 15% |
| $Pa_2O_3$ | 21% |
| $Pr_6O_{11}$ | 7% |

The percent REO as hereinafter reported is determined as the oxide of the rare earth elements obtained by precipitation of the elements as their oxalates and calcinations thereof.

The zeolite after exchange analyzed as follows:

$Na_2O = 4.35\%$, $NH_3 = 1.32\%$, $REO = 8.8\%$

It was combined with strong agitation in water with clay and alumina employing the following ratios on a V.F. base:

18.5% of the ammonium-rare earth exchanged zeolite, 16% pseudoboehmite and 65.5% ball clay.

The mixture was spray dried to give microspheres having a particle size range of 20-80 microns averages about 70 microns.

It was tested by a microactivity test as described in U.S. Pat. No. 4,058,484 to give the following results:

| M | S | S+ |
|---|---|---|
| 68.8% | 47.1% | 27.1% |

The catalyst was also tested for attrition index with the following result, AI=24. A duplicate sample had an AI of 29. The average was 26.5.

EXAMPLE 2

The catalyst of Example 1 was modified by adding sodium silicate solution (8.7 and $Na_2O$ and 28.8% $SiO_2$) to the slurry prior to spray drying.

Several samples of the catalyst were prepared varying the amount of added $Na_2O.SiO_2$ to produce various percentages of added $SiO_2$ in the catalyst. The catalyst was tested for activity and attrition index. Duplicate samples were run at the same $SiO_2$ level. The attrition index and microactivity as a function of the percent added $SiO_2$ is given in Table 1 and shown by Curve A in FIG. 1. Curve B plots the M activity in FIG. 1. Curve C plots the S+ activity.

TABLE 1

| % added $SiO_2$ | AI | M | S | S+ |
|---|---|---|---|---|
| 0 | 28 | 69 | 48 | 27 |
| 0.5 | 17 | 68 | 49 | 23 |
| 1.0 | 13 | 66 | 30 | 23 |
| 1.5 | 11 | 64 | 29 | 24 |
| 2.0 | 14 | 58 | 28 | 22 |
| 4.0 | 26 | — | — | — |
| 8.0 | Disintegrates | — | — | — |

Employing a zeolite having a $Na_2O$ content in excess of 4% to give a catalyst having a $Na_2O$ content in excess of about 0.8%, it is desirable to limit the $SiO_2$ as sodium silicate to about 0.5% or higher but not more than about 3.5% in order to obtain AI of less than about 20. In order to obtain an M activity of about 66 to about 68, we prefer to limit the addition to less than 1% $SiO_2$.

We found, however, that a materially greater latitude of the added $SiO_2$ and a much less reduction in the M value while obtaining a materially greater improvement in the AI is obtained by further reducing the Na content of the zeolite incorporated into the zeolite-matrix composite.

EXAMPLE 3

The zeolite as formulated in Example 2 and prior to incorporation into the slurry is calcined at 800° F. for three hours. The cooled zeolite is re-exchanged with rare earth sulfate solution to reduce the sodium content of the zeolite (expressed as $Na_2O$ on a volatile free basis) to 2.0% or less. The composite catalyst on a volatile free basis analyzed as 0.55% $Na_2O$.

EXAMPLE 4

To a slurry as in Example 2 incorporating the exchanged zeolite of Example 3, sodium silicate was added as in Example 2 in the amounts as stated in Table 2 and plotted in FIG. 2.

TABLE 2

| Sample | $SiO_2$ | $Na_2O$ | AI | Activity M | S | S+ |
|---|---|---|---|---|---|---|
| 1 Ex. 3 | 0 | .55 | 26 | 75 | 74 | 40 |
| 2 | 0.5 | .70 | 15 | 77 | 68 | 39 |
| 3 | 1.0 | .85 | 17 | 76 | — | 29 |
| 4 | 2.0 | 1.15 | 11 | 68 | 49 | 29 |
| 5 | 4.0 | | 26 | — | — | — |

For a zeolite catalyst containing a sodium content expressed as $Na_2O$ on a volatile free basis which is less than 1%, the addition of $SiO_2$ of up to 4% or higher is tolerable to give an abrasion index less than 20. However, there is substantial depreciation of the S activity.

The addition of about 1% $SiO_2$ causes a substantial depreciation of the S+ activity.

We have found that the M values and S+ conversion values may be materially improved by exchanging the spray dried microspheres to reduce the sodium content. The microspheres are stable in the exchange solution at the elevated temperatures of 160° F. and for the duration of the exchange, i.e., 1 hour.

EXAMPLE 5

Sample 4 of Example 3 was exchanged with $(NH_4)_2SO_4$ solution buffered at a pH of 4.5 by adding $H_2SO_4$ at ambient temperatures. The exchanged catalyst analyzed as 0.34% $Na_2O$. It had the following attrition index and microactivity:

$$AI=13 \; M=73 \; S=66 \; S+=55$$

It is recognized that the post exchange process introduces a complication and if the attrition index and microactivities obtainable without post exchange is suitable, we would prefer to add an amount of sodium silicate to introduce about 0.5% less than 1% of $SiO_2$ and preferably to control the $Na_2O$ content to less than about 0.9% based on the catalyst on a volatile free basis.

However, if it is desired to improve the attrition index and the microactivity above the above levels, we prefer to exchange the zeolite to a sufficiently low level of $Na_2O$ or post exchange, the catalyst or both so that we may add about 0.5% up to about 2.5% of $SiO_2$ and obtain a catalyst which will analyze $Na_2O$ of 0.5% and preferably less than 0.5% based on the catalyst in a volatile free basis.

The above observations as will appear from the above examples are for a catalyst slurry system composed of a faujasite zeolite, clay, hydrated alumina, and sodium silicate. The effect of the low concentrations of sodium silicate added to the slurry on the attrition resistance of the spray dried microspheres appears to be the result of the combined action of both the alumina and the concentration of the added silica in the catalyst is much greater in the order of one order of magnitude.

We claim:

1. A hydrocarbon conversion catalyst comprising a zeolite of the faujasite type, clay, alumina, and sodium silicate, the silicate expressed as $SiO_2$ being in the range of about 0.5% to about 3.5% based on the composite catalyst, on a volatile free basis, the sodium content of the catalyst being less than 1% of the catalyst on a volatile free basis.

2. A hydrocarbon conversion catalyst comprising a zeolite of the faujasite type, clay, alumina and sodium silicate, the silicate expressed as $SiO_2$ being in the range of about 0.5% to about 3.5% based on the composite catalyst, on a volatile free basis, in which the sodium content of the zeolite is substantially in excess of about 1% of the zeolite expressed as $Na_2O$ on a volatile free basis and the $SiO_2$ is in the range of about 0.5% to less than about 2% and the sodium content of the catalyst expressed as $Na_2O$, is less than 1% based on the composite catalyst on a volatile free basis.

3. A hydrocarbon conversion catalyst comprising a zeolite of the faujasite type, clay, alumina and sodium silicate, the silicate expressed as $SiO_2$ being in the range of about 0.5% to about 3.5% based on the composite catalyst, on a volatile free basis, in which the sodium content of the zeolite expressed as $Na_2O$ is substantially less than about 1% based on the exchanged zeolite on a volatile free basis and the sodium silicate, expressed as $SiO_2$ is in the range of about 0.5% to about 2% and the sodium content of the catalyst is less than 1% expressed as $Na_2O$, based on the composite catalyst on a volatile free basis.

4. A hydrocarbon conversion catalyst comprising a zeolite of the faujasite type, clay, alumina and sodium silicate, the silicate expressed as $SiO_2$ being in the range of about 0.5% to about 3.5% based on the composite catalyst, on a volatile free basis, in which the sodium content of the zeolite, expressed as $Na_2O$, is substantially in excess of about 1% based on the zeolite on a volatile free basis and the sodium silicate expressed as $SiO_2$ is in the range of about 0.5% to about 1% and the sodium content, expressed as $Na_2O$ of the catalyst is less than about 1% on the composite catalyst on a volatile free basis.

5. The catalyst of claim 1, 2, 3, or 4 which is formed by spray drying a slurry comprising a Y zeolite.

6. The catalyst of claim 1, 2, 3, or 5 which is formed by spray drying a slurry comprising a zeolite containing Na+ less than about 1% expressed as $Na_2O$, based on the zeolite on a volatile free basis, clay and pseudoboehmite and sodium silicate expressed as $SiO_2$ in the range of about 0.5% to about 2% and the sodium content of the catalyst is less than about 1% expressed as $Na_2O$, based on composite catalyst on a volatile free basis.

7. A process of preparing a catalyst which comprises mixing in water, a zeolite of the faujasite type, clay, pseudoboehmite and sodium silicate said sodium silicate being in an amount equivalent to $SiO_2$ in the range of about 0.5% to about 3.5% based on the composite catalyst on a volatile free basis and spray drying said slurry.

8. The process of claim 7 in which the sodium content of the zeolite, expressed as $Na_2O$, is substantially less than about 1% based on the zeolite on a volatile free basis and the sodium silicate expressed as $SiO_2$, is in the range of about 0.5% to about 2% and the sodium content of the catalyst, expressed as $Na_2O$, is less than 1% based on the composite catalyst on a volatile free basis.

9. The process of claim 7 in which the sodium content of the zeolite, expressed as $Na_2O$ is in excess of about 1% based on the exchanged zeolite on a volatile free basis and the sodium silicate, expressed as $SiO_2$, is in the range of about 0.5% to about 1% and the sodium content of the catalyst, expressed as $Na_2O$, is less than about 1% based on the composite catalyst on a volatile free basis.

10. The process of claims 7, 8, or 9 in which the zeolite is a Y zeolite.

* * * * *